UNITED STATES PATENT OFFICE.

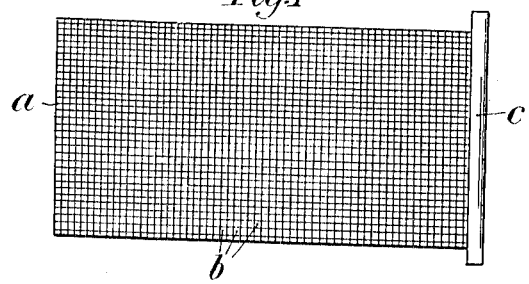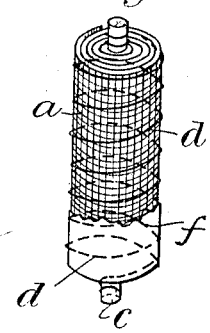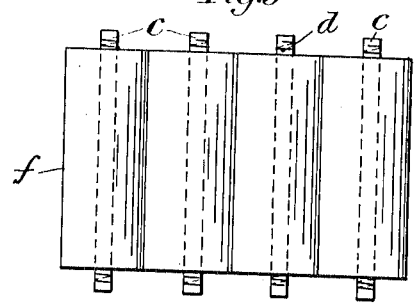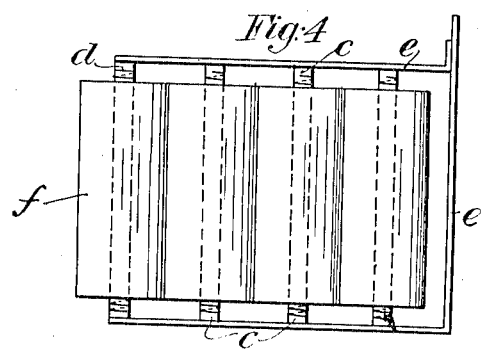

HEINRICH PAUL RUDOLF LUDWIG PÖRSCKE AND JULIUS ADOLPH ERWIN ACHENBACH, OF HAMBURG, GERMANY.

SECONDARY GALVANIC BATTERY.

1,119,313.   Specification of Letters Patent.   Patented Dec. 1, 1914.

Application filed April 22, 1911. Serial No. 622,644.

*To all whom it may concern:*

Be it known that we, HEINRICH PAUL RUDOLF LUDWIG PÖRSCKE and JULIUS ADOLPH ERWIN ACHENBACH, subjects of the German Emperor, residing at Hamburg, in Germany, have invented certain new and useful Improvements in Secondary Galvanic Batteries, of which the following is a specification.

The alkaline accumulators proposed by Edison and Jungner contain, as active substances, nickel or cobalt oxid compounds for the positive, and iron oxid compounds for the negative electrodes. The initial material employed for the positive electrodes is generally green oxyhydrate of nickel, while that for the negative electrodes is generally ferrous oxid of iron. Both these materials are known to be poor conductors of electricity. Edison and Jungner have therefore been led to add suitable conductive means such as graphite or shavings of nickel. These inert additions necessarily increase the weight very considerably. It may be taken that on an average the positive electrodes contain approximately 50% by weight of active conductive material and 50% of inert conductive material. The mixture has been inclosed under high pressure in perforated conductive metal pockets, it having hitherto been found impossible to form a solid mass of the powdered active material. The weight of the metal pockets containing the active substance, as well as that of the metal supports carrying the pockets further increase the weight of the electrodes very considerably. A positive electrode of this description contains roughly, assuming the total weight to be 100 grams, 25 grams of oxyhydrate of nickel, 25 grams of inactive conducting additions and 50 grams of supporting and pocket material. The active material in these accumulators is only very incompletely utilized. Furthermore, in time the active substance passes through the perforations in the metal pockets into the electrolyte, which results in the contact being broken between the active material and the conducting substance.

The object of the present invention is to remove these disadvantages and to enable all the components to be utilized as fully as possible, with a view to lowering the weight with respect to the watt-hour capacity of alkaline accumulators.

The invention is illustrated in the accompanying drawing, in which:—

Figure 1 is a perspective elevation of a partly prepared electrode, Fig. 2 a similar view of the finished electrode, Fig. 3 a side-view of a series of electrodes placed together for battery work, and Fig. 4 a side-view showing said electrodes joined to a conductive frame.

For the purpose of our invention we make the poorly-conductive active compounds, in the form of a fine and non-coherent powder, into a stiff paste, after moistening them with water or alkaline or other suitable solutions, and then paste them into a piece of woven fabric or gauze made of nickel or other suitable metal. The metal fabric must be very fine, the meshes being usually less than 0.1 mm. in width. We have found by experience that metal gauze having 150–250 meshes per square cm. is suitable. In the accompanying drawing, $a$ represents a piece of fabric of this kind, the size of the meshes being, however, greatly exaggerated. The gauze is preferably so pasted with the mass that only the meshes are filled with small scales $b$ of active mass, so that the thickness is not increased by a coating of the substance on the surface. Before pasting, the metal gauze is preferably provided with a terminal conductor $c$ in the form of a wire or strip or a small tube, which may be electrically welded along one edge of the gauze. The pasted metal gauze may then be rolled tightly around the terminal conductor and with a view to obtaining perfect coherence between the active substance and the support thereof the cylindrical body may then be rolled upon a suitable metal or glass plate, or may be pressed in a mold.

Nickel wire $d$, preferably thin, may be wound around the electrode, and have its ends attached to the terminal conductor. $f$ is a supporting sleeve which may be of cotton spun on directly, of cloth tied or sewed in place, or the like. The inclosing of the electrode with chemically indifferent and non-conducting material prevents the pulverulent substance from being washed out of the fine pores of the outer layer, but is not essential to the invention.

Owing to the extreme distribution of the poorly conducting active substance in the finely meshed metal gauze, it is not necessary to mix an inactive conducting material with the active mass. The function of the inactive conducting medium is performed by the metal gauze, which serves as an extremely light and satisfactory conducting support with a large superficial area, and occupies very little space when rolled up. By rolling up the metal gauze tightly into a rod, firm and certain contact is insured between the active paste and the gauze, the layers of gauze placed one upon the other render it impossible for the substance to be washed out, though the electrolyte has sufficient diffusion. An electrode thus produced is not injuriously affected by gas pressure or changes of volume of the active material, during charging and discharging, the contact remaining perfect. The electrode also resists the action of vibration and mechanical influences.

A plurality of the above described roller shaped electrodes may be combined to form a composite electrode for a battery by placing them in a supporting frame $e$ made of suitable material, preferably nickel, without any, or with very little, space between them. The electrodes are secured to the frame by the two ends of the terminal wires, rods, tubes or the like $c$ projecting centrally from either end of the electrodes, these terminals being riveted or soldered to the frame, as shown in Fig. 4.

What we claim as our invention and desire to secure by Letters Patent of the United States is:—

1. A cathode, for use in an alkaline galvanic secondary battery, composed of a framework of fine, tightly-rolled nickel gauze, inactive in the alkaline electrolyte and supporting and rendering more conductive the non-coherent active nickel hydroxid in the interstices of the same, and a protecting insulating and supporting envelop about the framework.

2. A cathode, for use in alkaline galvanic secondary batteries, composed of a porous metallic framework inactive in the alkaline solution, a mass of pulverulent, non-coherent, poorly conductive active material, containing an oxid of the metal of the framework and supported and rendered more conductive by said framework, an exterior protecting and insulating sleeve, and terminals attached to said framework.

3. A cathode, for use in alkaline galvanic secondary batteries, composed of a porous metallic framework of nickel inactive in the alkaline solution, a mass of pulverulent, non-coherent, poorly conductive active material of nickel hydroxid supported and rendered more conductive by said framework, terminals projecting from said framework, and an enveloping projecting and retaining sleeve of non-conductive material around said framework.

4. A cathode, for use in alkaline galvanic secondary batteries, composed of a porous metallic framework of nickel gauze inactive in the alkaline solution, a mass of pulverulent, poorly conductive, non-coherent active material of nickel hydroxid supported in the interstices of said framework, a terminal rod soldered to and tightly wrapped in said framework, said terminal rod being inactive in the alkaline solution and projecting from the body of the electrode, and an enveloping, protecting and retaining sleeve of non-conductive material about the framework and the active material therein.

In witness whereof we have signed this specification in the presence of two witnesses.

HEINRICH PAUL RUDOLF LUDWIG PÖRSCKE.
JULIUS ADOLPH ERWIN ACHENBACH.
Witnesses:
   ERNEST H. L. MUMMENHOFF,
   EDUARD HOPF.